(12) United States Patent
Sousa Canastra et al.

(10) Patent No.: US 12,479,391 B2
(45) Date of Patent: Nov. 25, 2025

(54) AIRBAG MODULE AND VEHICLE STEERING UNIT HAVE AN AIRBAG MODULE OF THIS TYPE

(71) Applicants: Dalphi Metal España SLU, Vigo (ES); Safe Life Indústria de Componentes de Segurança Automóvel LDA, Gemieira (PT); ZF AUTOMOTIVE SAFETY GERMANY GMBH, Aschaffenburg (DE)

(72) Inventors: Bruno Joaquim Sousa Canastra, Viana do Castelo (PT); Samuel Jose Soares Da Cunha, Vila Praia de Ancora (PT)

(73) Assignees: Dalphi Metal España SLU, Vigo (ES); Safe Life Industria de Componentes de Segurança Automóvel LDA, Gemieira (PT); ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 18/293,887

(22) PCT Filed: Jul. 8, 2022

(86) PCT No.: PCT/EP2022/069027
§ 371 (c)(1),
(2) Date: Jan. 31, 2024

(87) PCT Pub. No.: WO2023/011847
PCT Pub. Date: Feb. 9, 2023

(65) Prior Publication Data
US 2025/0121790 A1    Apr. 17, 2025

(30) Foreign Application Priority Data
Aug. 3, 2021    (DE) .................... 20 2021 104 137.4

(51) Int. Cl.
*B60R 21/203* (2006.01)

(52) U.S. Cl.
CPC ........ *B60R 21/203* (2013.01); *B60R 21/2035* (2013.01); *B60R 21/2037* (2013.01)

(58) Field of Classification Search
CPC .............. B60R 21/203; B60R 21/2035; B60R 21/2037
See application file for complete search history.

(56) References Cited

U.S. PATENT DOCUMENTS 5,636,858 A * 6/1997 Niederman ......... B60R 21/2035
280/728.2
5,775,725 A * 7/1998 Hodac ................. B60R 21/2037
411/348

(Continued)

FOREIGN PATENT DOCUMENTS

DE 20017527 U1 2/2001
DE 20210741 U1 11/2002

(Continued)

OTHER PUBLICATIONS

PCT International Search Report for corresponding International Application Serial No. PCT/EP2022/069027, mailed Oct. 17, 2022, pp. 1-4.

*Primary Examiner* — Laura Freedman
(74) *Attorney, Agent, or Firm* — Tarolli, Sundheim, Covell & Tummino LLP

(57) ABSTRACT

The invention relates to an airbag module (22) for mounting on a steering control element (10) of a motor vehicle, the steering control element being rotatable about an axis (A), and the airbag module comprising: a module housing (24) for holding a folded airbag (26), the module housing comprising a module bottom (30); and a metal spring (28) for locking the airbag module (22) on the steering control element (10), the metal spring being pre-mounted on the (Continued)

module bottom (30) and having a locking portion (32) which can be elastically deflected perpendicularly to the axis (A); wherein, on the module bottom (30), a spacer (34) is provided, which axially adjoins the locking portion (32) of the metal spring on a side of the metal spring (28) facing the folded airbag (26) and which can be elastically deflected together with said locking portion (32) of the metal spring (28) in a deflection direction (x) perpendicular to the axis (A). The invention also relates to a vehicle steering unit (12) having an airbag module (22) of this type.

9 Claims, 4 Drawing Sheets

(56) References Cited

U.S. PATENT DOCUMENTS

| | | | | |
|---|---|---|---|---|
| 6,474,682 B2* | 11/2002 | Ikeda | ............... | B60Q 5/003 |
| | | | | 200/61.55 |
| 6,688,638 B2* | 2/2004 | Schutz | ............... | B60Q 5/003 |
| | | | | 200/61.55 |
| 7,464,959 B2* | 12/2008 | Pillsbury, IV | ........ | B60Q 5/003 |
| | | | | 200/61.55 |
| 8,042,830 B2* | 10/2011 | Hagelgans | ......... | B60R 21/2035 |
| | | | | 280/732 |
| 8,342,567 B2* | 1/2013 | Sasaki | ............... | B60Q 5/003 |
| | | | | 200/61.55 |
| 8,419,052 B2* | 4/2013 | Yamaji | ............... | B60R 21/2037 |
| | | | | 280/728.2 |
| 8,500,156 B2* | 8/2013 | Banno | ............... | B60R 21/2037 |
| | | | | 280/728.2 |
| 8,556,292 B2* | 10/2013 | Umemura | ............. | B62D 7/222 |
| | | | | 280/731 |
| 8,794,662 B2* | 8/2014 | Ishii | ................... | B60R 21/2037 |
| | | | | 280/728.2 |
| 8,919,812 B2* | 12/2014 | Schutz | ............... | B60R 21/2037 |
| | | | | 280/728.2 |
| 9,120,453 B2* | 9/2015 | Obayashi | ............. | B60R 21/203 |
| 9,365,177 B2* | 6/2016 | Bachmann | ........... | B60R 21/203 |
| 9,731,747 B2* | 8/2017 | Obayashi | ........... | B60R 21/2037 |
| 10,875,564 B2* | 12/2020 | Minami | ................ | B62D 7/222 |
| 11,267,423 B2* | 3/2022 | Ko | ..................... | B60R 21/2037 |
| 11,305,716 B2* | 4/2022 | Hirota | .............. | B60R 21/21656 |
| 11,370,377 B2* | 6/2022 | Schütz | ............... | B60R 21/2037 |
| 11,498,506 B2* | 11/2022 | McMillan | ............... | B62D 1/11 |
| 2003/0038462 A1* | 2/2003 | Leibach | ............. | B60R 21/2035 |
| | | | | 280/731 |
| 2004/0011157 A1* | 1/2004 | Hauer | .................... | B62D 1/04 |
| | | | | 74/552 |

FOREIGN PATENT DOCUMENTS

| | | |
|---|---|---|
| DE | 102012002722 A1 | 3/2013 |
| DE | 102018112224 A1 | 11/2019 |
| WO | 2008/025641 A1 | 3/2008 |
| WO | 2013/051409 A1 | 4/2013 |

\* cited by examiner

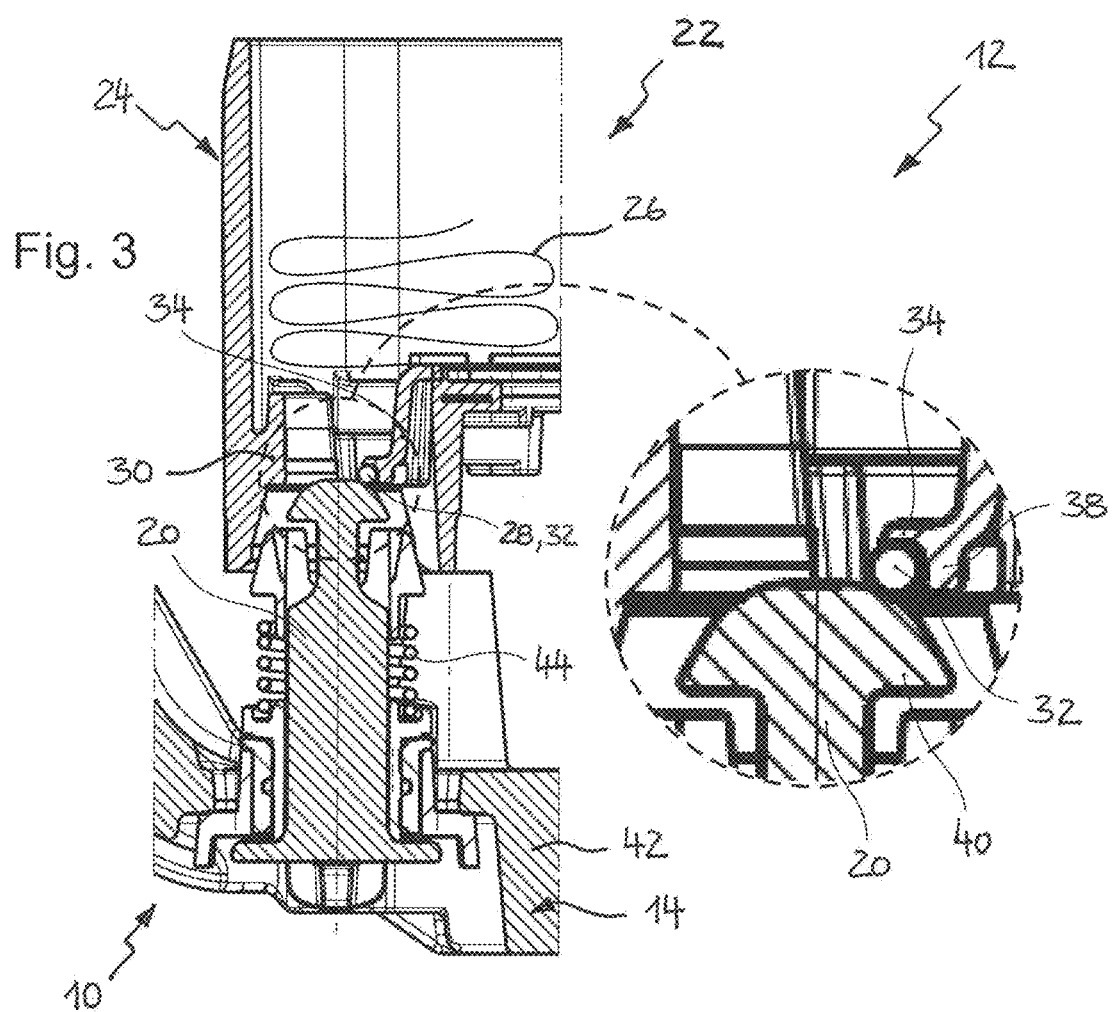
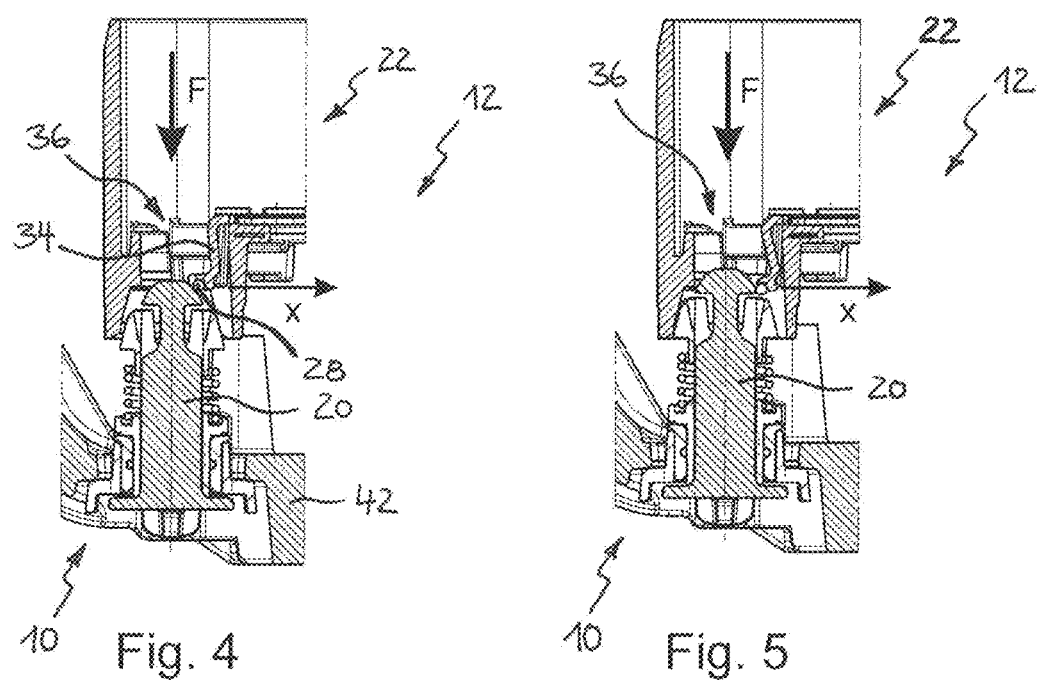

AIRBAG MODULE AND VEHICLE STEERING UNIT HAVE AN AIRBAG MODULE OF THIS TYPE

RELATED APPLICATIONS

This application is a U.S. National Stage Application filed under 35 USC 371, claiming priority to Serial No. PCT/EP2022/069027, filed on 8 Jul. 2022; which claims priority from Patent Application 20 2021 104 137.4, filed 3 Aug. 2021, the entireties of which are hereby incorporated herein by reference.

BACKGROUND

The invention relates to an airbag module for assembly on a steering handle of an automotive vehicle rotatable about an axis A, comprising a module case for accommodating a folded airbag that includes a module bottom and a metal spring for locking the airbag module to the steering handle which is pre-assembled on the module bottom and includes a locking portion elastically deflectable transversely to the axis A. Moreover, the invention also includes a vehicle steering unit having such airbag module.

Nowadays, a driver-side front airbag module is usually arranged in the center of a steering handle in the form of a steering wheel and is especially locked with a hub of the steering wheel. Such locking connection has a certain axial play, for example due to measuring tolerances and the guarantee of a safe locking and/or due to progressing material aging. In addition, the locking connection can also define a desired axial play to enable a relative movement and to trigger a vehicle horn by pressing down the airbag module.

During the driving operation, said axial play of the locking connection may result in undesired noise development on poor road surfaces or in the case of steering wheel vibrations, if the locking elements involved collide. The noise is audible/disturbing for the vehicle occupant especially when the locking elements involved are metal components, which is usually the case due to the safety requirements and the forces occurring upon release of the airbag module.

As shown in the FIGS. 8 and 9, it is already known from prior art to provide a locking element 20' configured as a locking bolt in the region of its locking lug 40' with a (silencing) plastic sleeve 100 so as to avoid direct contact between the locking bolt and the metal spring 28'. Said plastic sleeve 100 must additionally be separately manufactured, however, and subsequently assembled to the locking element 20', thus causing the manufacturing and cost expenditure for the vehicle steering unit 12' to increase undesirably.

SUMMARY

Therefore, it is the object of the invention to provide an airbag module in which, after assembly thereof to the steering handle of an automotive vehicle, in the driving operation undesired noise development between the airbag module and the steering handle is reliably suppressed or minimized with little effort.

According to the invention, this object is achieved by an airbag module of the afore-mentioned type in which, on the module bottom, a spacer is provided that abuts, on a side of the metal spring facing the folded airbag, axially on the locking portion of the metal spring and is elastically deflectable along with the locking portion in a deflecting direction x extending transversely to the axis A. The spacer provided on the module bottom serves, in the locked state of the airbag module, for silencing, whereby more complicated silencing measures such as the afore-mentioned plastic sleeve can be omitted.

In a preferred embodiment of the airbag module, the spacer is formed integrally with the module bottom so that no manufacturing or mounting steps for separate silencers are not necessary.

Especially preferred, the module bottom is a plastic component, in particular an injection-molded part made of plastic. A plastic material usually is generally suited for silencing, in particular when it prevents direct metal-metal contact between the metal spring and a (usually equally metallic) locking element of the steering handle. The manufacture as an injection-molded part renders a geometrical adaptation of the module bottom, especially integral formation of a spacer, possible with a largely negligible extra effort.

According to another embodiment of the airbag module, the spacer includes an axial extension abutting on the locking portion of the metal spring in the deflecting direction. When assembling the airbag module, the locking portion of the metal spring is biased and deflected in the deflecting direction by a locking element of the steering handle, for example. The spacer is coupled via the axial extension such that the metal spring "entrains" the spacer in the deflecting direction. The locking portion of the metal spring and the spacer consequently jointly perform at first a deflecting movement in the deflecting direction and, after that, an opposite locking movement so that a particularly reliable and reproducible locking of the airbag module is ensured.

Of preference, the module bottom includes an axial bottom opening for receiving a locking element of the steering handle, wherein both the locking portion of the metal spring and the spacer protrude into an opening cross-section of the bottom opening. In this way, the airbag module can be locked with the steering handle by an axial mounting movement in a simple and reliable manner and requiring little space.

Incidentally, the invention also comprises a vehicle steering unit, comprising an afore-described airbag module and a steering handle rotatable about an axis A on which an (especially metallic) locking element including a locking lug for locking with the metal spring of the airbag module is provided, wherein the spacer of the module bottom in the locked state of the airbag module extends axially between the locking lug and the locking portion of the metal spring. Consequently, undesired contact between the metal spring and the (especially equally metallic) locking lug as well as a resulting contact noise are reliably prevented by the spacer. A possible contact noise of the spacer with the locking lug and/or the metal spring is negligible, however, in particular when the spacer is made of plastic material.

According to one embodiment of the vehicle steering unit, the airbag module is movable to a limited extent in the axial direction relative to the steering handle, such as for actuating a vehicle horn, wherein a spring element that biases the airbag module and the steering handle axially away from each other is provided.

The spring element in this embodiment may particularly be a helical compression spring disposed between the steering handle and the airbag module that encloses the locking element of the steering handle.

The locking element is preferred to be a separate locking bolt fastened to the steering handle which extends in the axial direction and includes the locking lug at an end facing the airbag module.

Alternatively, the locking element may as well be formed integrally with a skeleton of the steering handle, the locking element extending in the axial direction toward the airbag module and including the locking lug at its free axial end.

DRAWINGS

Further features and advantages of the invention will be evident from the following description of a preferred embodiment with reference to the drawings, wherein:

FIG. 3 shows a detailed section of the vehicle steering unit according to the invention before the airbag module is locked to the steering handle;

FIG. 4 shows a detailed section of the vehicle steering unit according to FIG. 3 at the beginning of the locking operation;

FIG. 5 shows a detailed section of the vehicle steering unit according to FIG. 3 at the end of the locking operation;

DESCRIPTION

Figure 1:
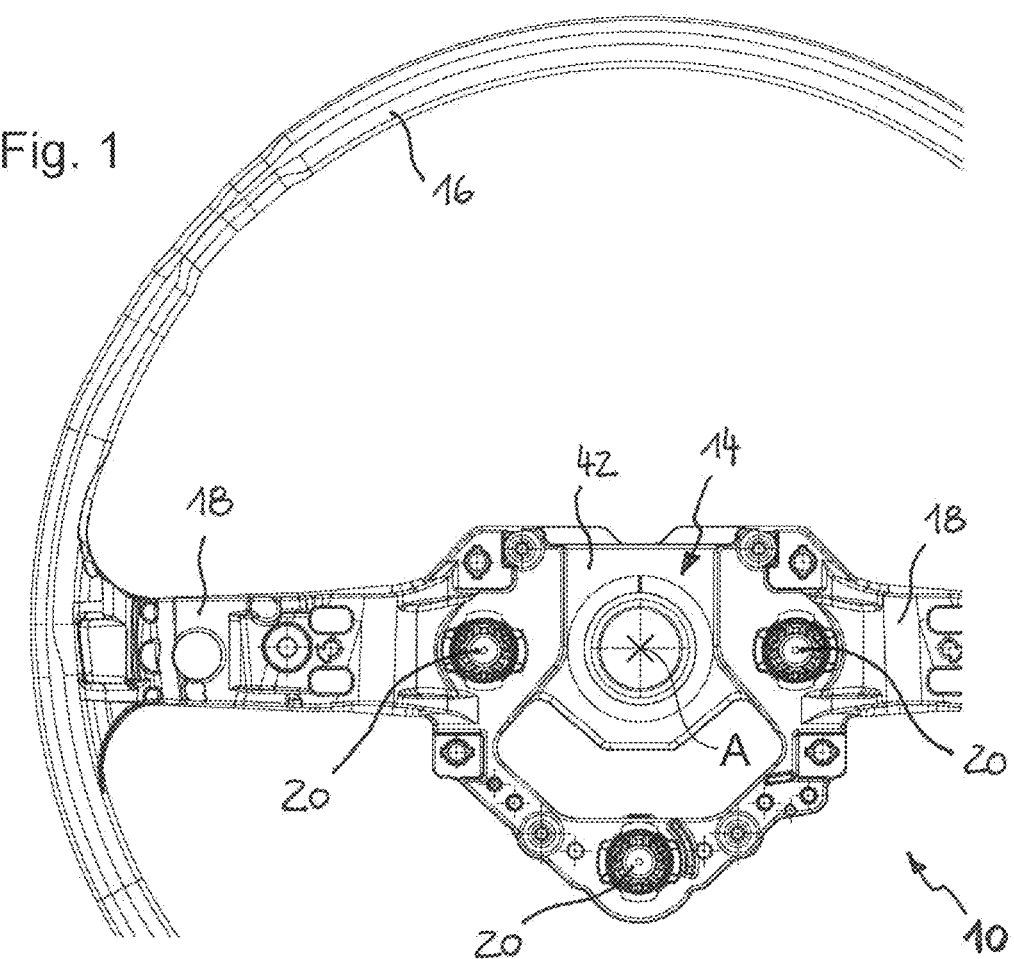
FIG. 1 shows an axial top view of a steering handle of a vehicle steering unit according to the invention.

FIG. 1 illustrates a cutout of a steering handle 10 for a vehicle steering unit 12 of an automotive vehicle in an axial top view, wherein the steering handle 10 is rotatable, in its mounted state, about an axis A. In the shown embodiment, the steering handle 10 is a steering wheel comprising a central hub 14, a circumferential rim 16 as well as spokes 18 for connecting the rim 16 to the hub 14.

On the steering wheel handle 10, concretely on the hub 14 according to FIG. 1, locking elements 20 for fastening an airbag module 22 are provided in a central region of the steering handle 10.

Figure 2:
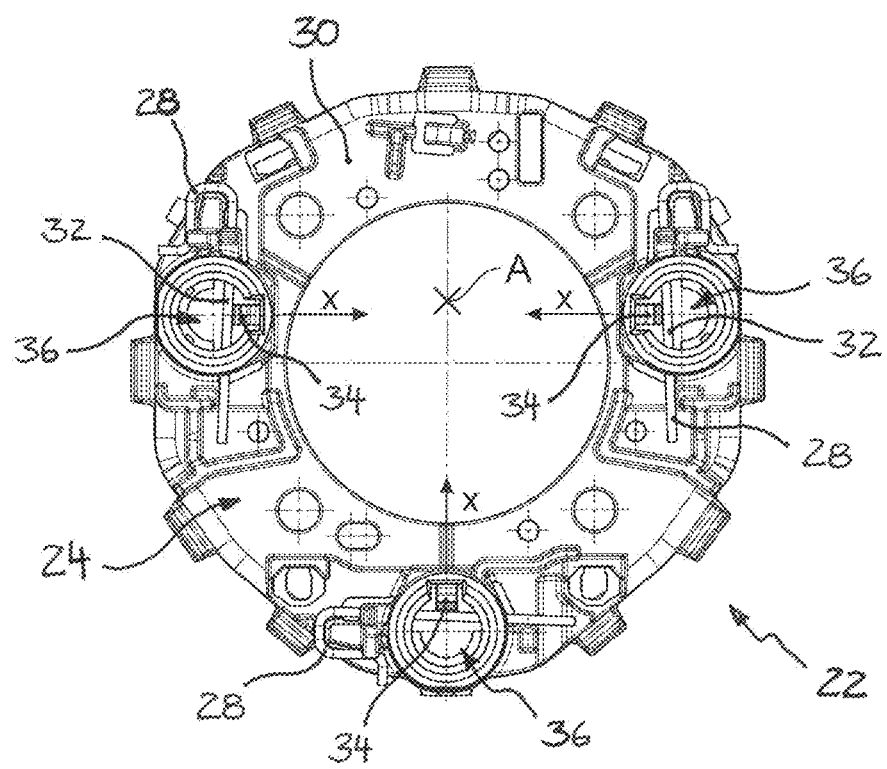
FIG. 2 shows an axial bottom view of a module bottom of an airbag module according to the invention.

The airbag module 22 for assembly on the steering handle 10 rotatable about the axis A comprises a module case 24 for accommodating a folded airbag 26 (see FIGS. 3 and 6) as well as at least one metal spring 28 for locking the airbag module 22 to the steering handle 10. The module case 24 includes a module bottom 30 which, in FIG. 2, is shown in an axial bottom view and, in the mounted state of the airbag module, axially abuts on the hub 14 of the steering handle 10. In the present embodiment, three metal springs 28 are provided which are pre-assembled on the module bottom 30 and each has a locking portion 32 that is elastically deflectable in a deflecting direction x extending transversely to the axis A.

As is indicated in FIG. 2, on the module bottom 30 a spacer 34 is provided which on a side of the assigned metal spring 28 facing the folded airbag 26 axially abuts on the locking portion 32 thereof (see also FIGS. 3 to 6) and is elastically deflectable, along with said locking portion 32, in the deflecting direction x extending transversely to the axis A. Concretely speaking, in the present embodiment, three spacers 34 are provided to each of which a metal spring 28 is assigned.

The module bottom 30 includes, according to FIG. 2, at least one axial bottom opening 36 for accommodating a locking element 20 of the steering handle 10, wherein both the locking portion 32 of the assigned metal spring 28 and the assigned spacer 34 protrude into an opening cross-section of the at least one bottom opening 36. In the present embodiment, concretely three axial bottom openings 36 are provided each being assigned to a metal spring 28 or, resp., to a spacer 34.

The spacers 34 in the illustrated embodiment of the airbag module 22 are formed integrally with the module bottom 30 (see also FIGS. 3 to 6), wherein the module bottom 30 in this case is a plastic component, in particular an injection-molded part made of plastic.

FIG. 3 illustrates a detailed section of the vehicle steering unit 12 in the region of a locking connection of the airbag module 22 and the steering handle 10, however prior to the locking thereof.

By means of FIG. 3 and its enlarged image cutout, it is clearly visible that a portion of the spacer 34 on a side of the metal spring 28 facing the folded airbag 26 axially abuts on the locking portion 32 thereof. Further, it is obvious that the spacer 34 has an axial extension 38 that abuts, in the deflecting direction x, on the locking portion 32 of the metal spring 28.

In the illustrated embodiment of the vehicle steering unit 12, the locking element 20 is a separate locking bolt fastened to the steering handle 10, the locking bolt extending in the axial direction and including a locking lug 40 for locking with the metal spring 28 of the airbag module 22 at an axial end facing the airbag module 22. At an opposite axial end, the locking bolt is fastened to the steering handle 10, in particular to a skeleton 42 of the steering handle 10, in the region of the hub 14.

However, alternatively it is also imaginable for the locking element 20 to be formed integrally with the skeleton 42 of the steering handle 10, the locking element 20 extending in the axial direction toward the airbag module 22 and at its free axial end including the locking lug 40.

Based on the forces occurring upon release of the airbag module 22 and the associated safety requirements, the locking element 20 and the locking lug 40 in this case are manufactured particularly from metal independently of a separate configuration as locking bolt or integration in one piece in the skeleton 42.

Figure 6:
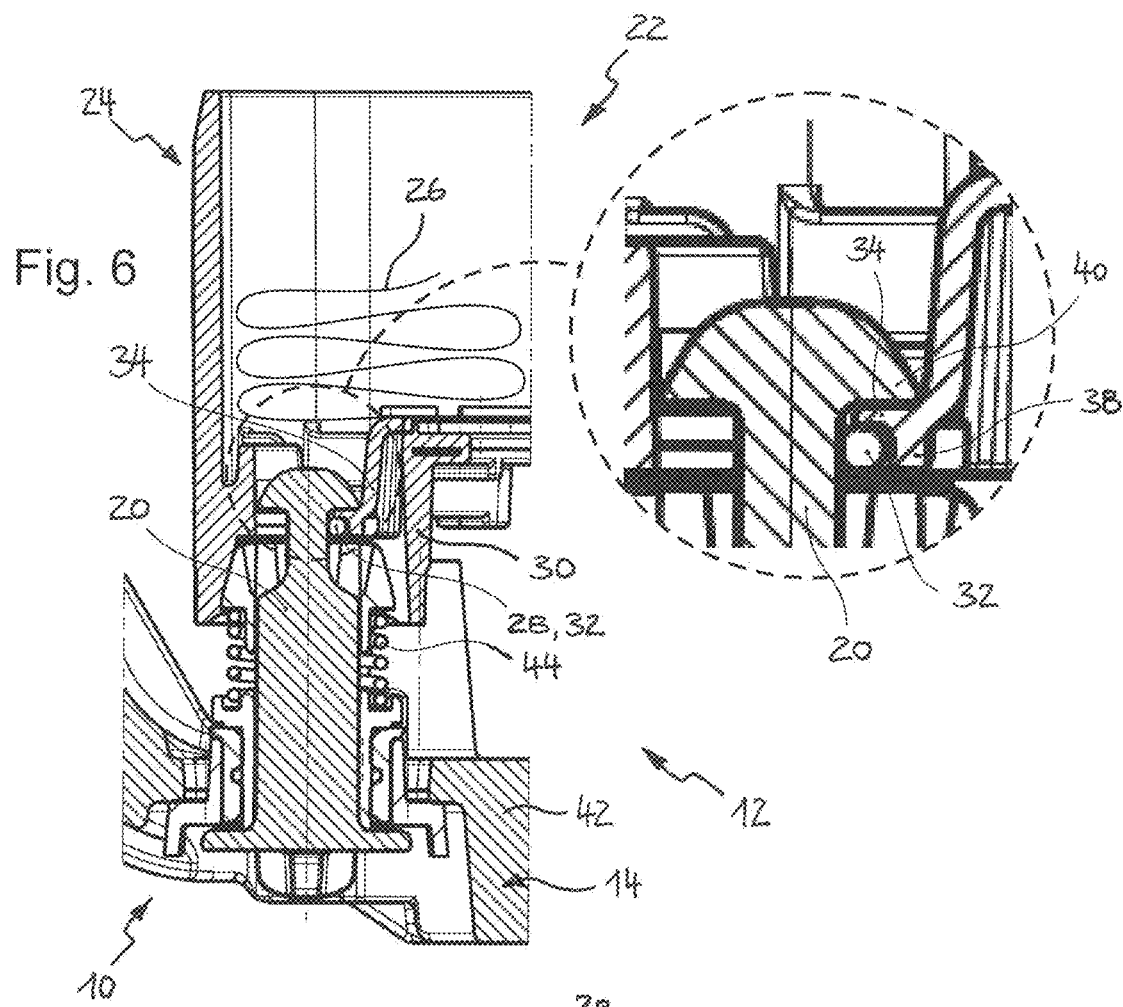
FIG. 6 shows a detailed section of the vehicle steering unit according to FIG. 3 after the airbag module is locked to the steering handle.
Figure 7:
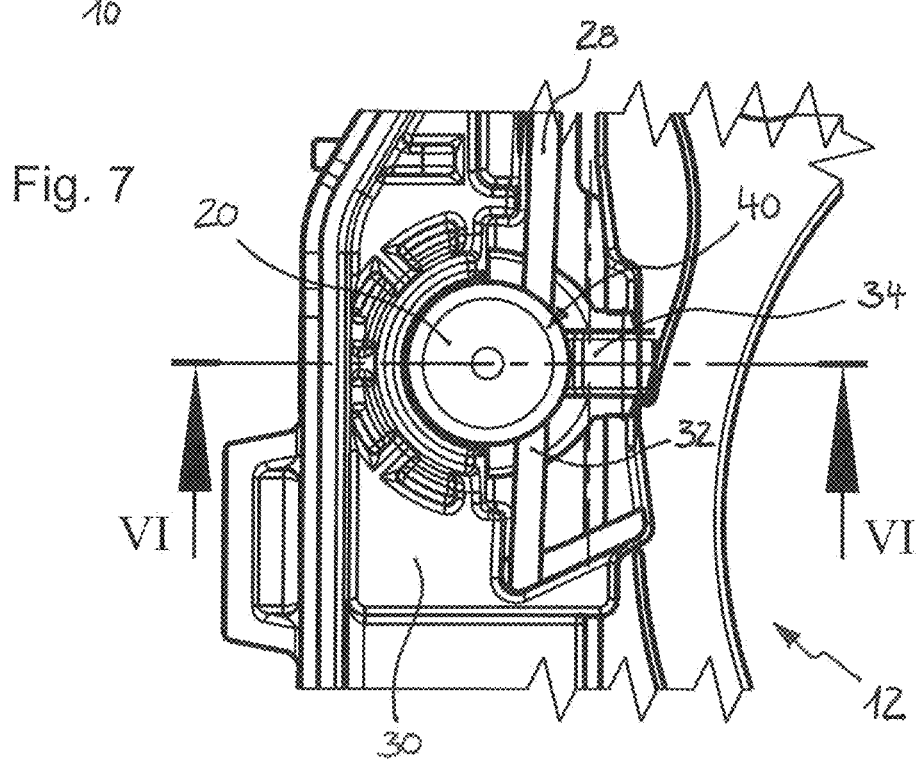
FIG. 7 shows a top view onto the locking connection of the vehicle steering unit shown in FIG. 6.
Figure 8:
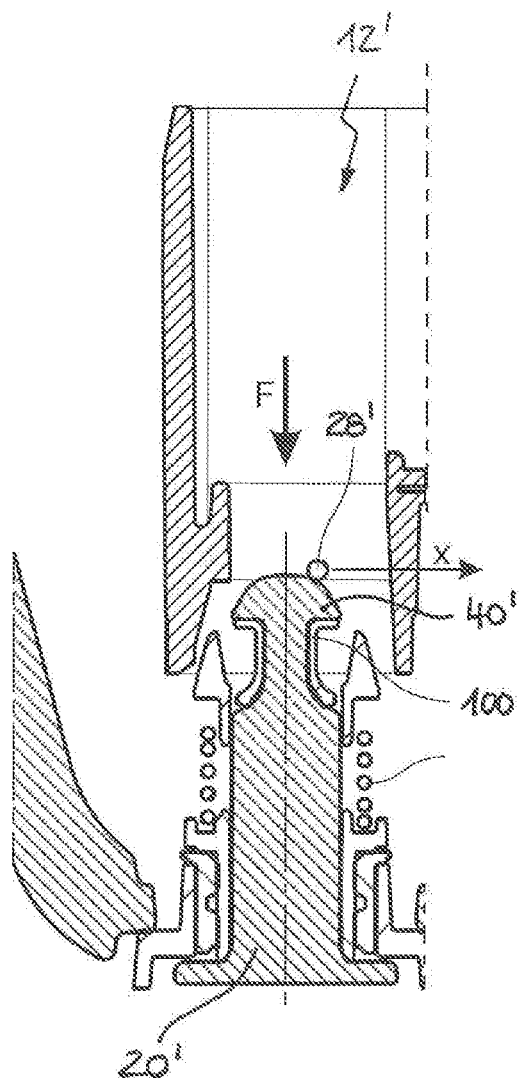
FIG. 8 shows a detailed section of a conventional vehicle steering unit before the airbag module is locked to the steering handle.
Figure 9:
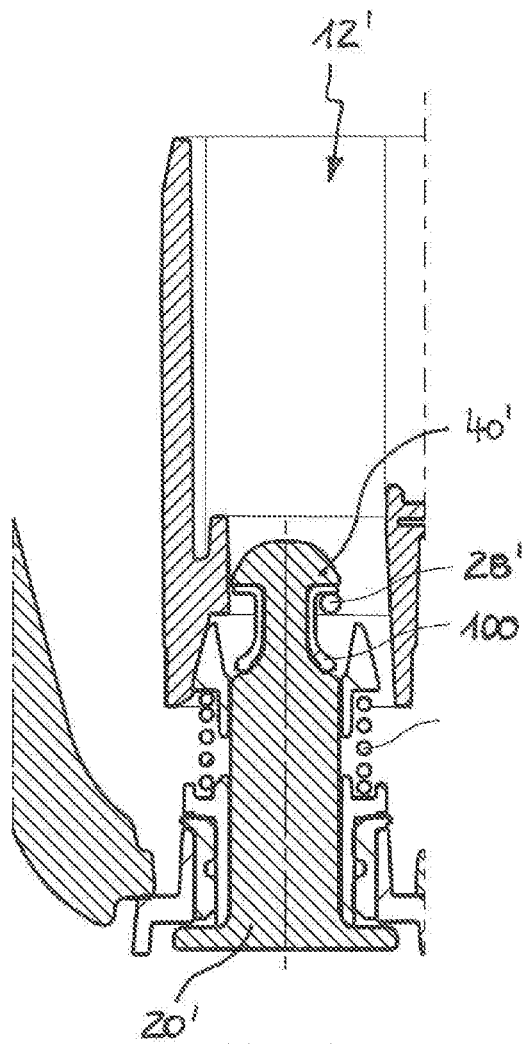
FIG. 9 shows a detailed section of the conventional vehicle steering unit according to FIG. 8 after the airbag module is locked to the steering handle.

As shown in FIGS. 4 and 5, by applying an axial mounting force F to the airbag module 22, the spacer 34 is elastically deflected, along with the locking portion 32 of the metal spring 28, in the deflecting direction x, until the spacer 34 snaps back, along with the locking portion 32 of the metal spring 28, against the deflecting direction x and engages behind the locking lug 40 of the locking element 20 according to FIGS. 6 and 7.

By means of FIG. 6 and its enlarged image cutout, it is clearly evident that a portion of the spacer 34 in the shown locked state of the airbag module 22 extends in the axial direction between the locking lug 40 and the locking portion 32 of the metal spring 28. In this way, direct metal-to-metal contact between the metal spring 28 and the metallic locking lug 40 is prevented and, thus, also a resulting contact noise is suppressed or at least strongly dampened.

For actuating a vehicle horn, the airbag module 22 in the illustrated embodiment of the vehicle steering unit 12 is supported to be movable to a limited extent in the axial direction relative to the steering handle 10. According to FIGS. 3 to 6, a spring element 44 is provided which biases the airbag module 22 and the steering handle 10 axially away from each other. In this case, the spring element 44 concretely is a helical compression spring disposed between the steering handle 10 and the airbag module 22 which encloses the locking element 20. For actuation of the vehicle horn, the airbag module 22 must be moved, against a spring force of the helical compression spring, axially toward the steering handle 10, wherein the locking portion 32 of the metal spring 28 slides axially along the locking bolt in a region of reduced locking bolt cross-section.

The invention claimed is:

1. An airbag module for assembly on a steering handle of an automotive vehicle rotatable about an axis, comprising
   a module case for accommodating a folded airbag that includes a module bottom, and
   a metal spring for locking the airbag module to the steering handle being pre-assembled on the module bottom and including a locking portion elastically deflectable transversely to the axis,
   wherein on the module bottom a spacer is provided which abuts, on a side of the metal spring facing the folded airbag, axially on the locking portion of the metal spring and is elastically deflectable, along with said locking portion of the metal spring, in a deflecting direction extending transversely to the axis, wherein the spacer is formed integrally with the module bottom.

2. The airbag module according to claim 1, wherein the module bottom is a plastic component.

3. The airbag module according to claim 1, wherein the spacer includes an axial extension abutting on the locking portion of the metal spring in the deflecting direction.

4. The airbag module according to claim 1, wherein the module bottom includes an axial bottom opening for receiving a locking element of the steering handle, wherein both the locking portion of the metal spring and the spacer protrude into an opening cross-section of the bottom opening.

5. A vehicle steering unit, comprising
   an airbag module according to claim 1, and
   a locking element having a locking lug for locking with the metal spring of the airbag module being provided on the steering handle,
   wherein the spacer of the module bottom extends, in a locked state of the airbag module, in an axial direction between the locking lug and the locking portion of the metal spring.

6. The vehicle steering unit according to claim 5, wherein the airbag module is movable to a limited extent in the axial direction relative to the steering handle, wherein a spring element is provided for biasing the airbag module and the steering handle axially away from each other.

7. The vehicle steering unit according to claim 6, wherein the spring element is a helical compression spring being disposed between the steering handle and the airbag module and enclosing the locking element.

8. The vehicle steering unit according to claim 5, wherein the locking element is a separate locking bolt fastened to the steering handle, the locking bolt extending in the axial direction and including the locking lug at an end facing the airbag module.

9. The vehicle steering wheel according to claim 5, wherein the locking element is formed integrally with a skeleton of the steering handle, wherein the locking element extends in the axial direction toward the airbag module and at its free axial end includes the locking lug.

\* \* \* \* \*